June 17, 1924.

A. B. BELGARD ET AL

SPECTACLE TEMPLE AMD METHOD OF MAKING THE SAME

Filed Feb. 19, 1923

1,498,227

Inventors.
Austin B. Belgard.
James W. Welsh.
by David Rines
Attorney:-

Patented June 17, 1924.

1,498,227

UNITED STATES PATENT OFFICE.

AUSTIN B. BELGARD, OF CHICAGO, ILLINOIS, AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Application filed February 19, 1923. Serial No. 620,049.

*To all whom it may concern:*

Be it known that we, AUSTIN B. BELGARD and JAMES W. WELSH, citizens of the United States, and residents, respectively, of Chicago, county of Cook, and State of Illinois, and Providence, county of Providence, and State of Rhode Island, have jointly invented a new and useful Improvement in Spectacle Temples and Methods of Making the Same, of which the following is a specification.

The present invention relates to spectacle temples of the combined-metal-and-non-metallic type, and it has for its object to provide a new and improved temple of the said type that shall have the property of flexibility.

With the above end in view, the invention consists of the improved spectacle temple and method of making the same hereinafter described, illustrated in the accompanying drawings and defined in the appended claims.

Figure 1:
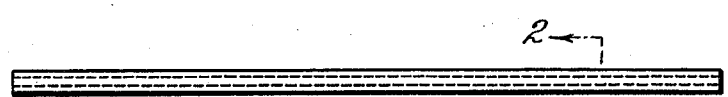
Figure 2:
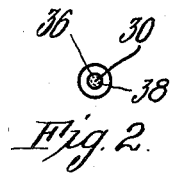
Figure 3:
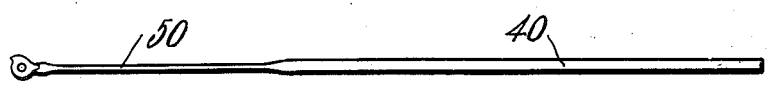
Figure 4:
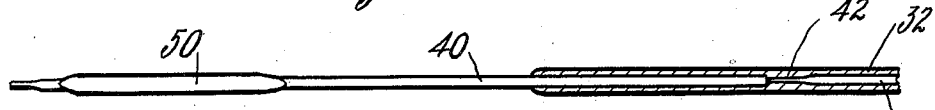
Figure 5:
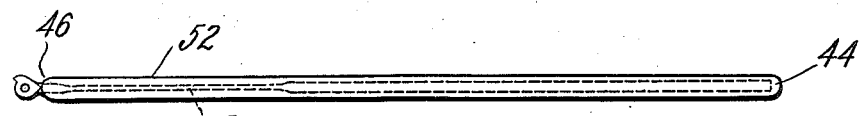
Figure 6:
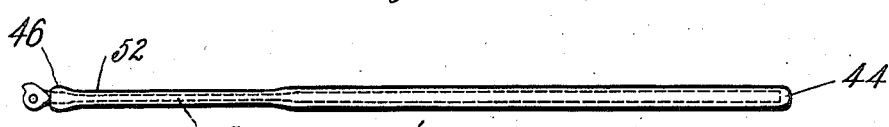
Figure 7:
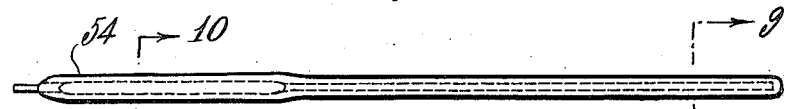
Figure 8:
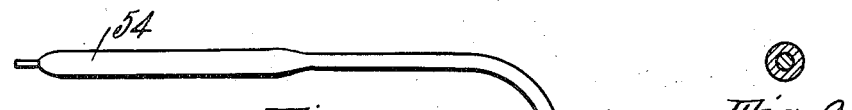
Figure 9:
Figure 10:
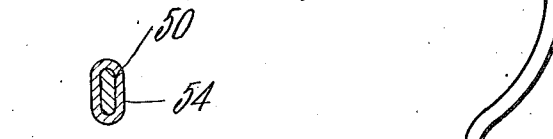

In the drawings, illustrating a preferred embodiment of the present invention, Fig. 1 is a view of a non-metallic tube adapted to be combined with a metal rod to form a temple according to a preferred embodiment of the present invention; Fig. 2 is a section taken upon the line 2—2 of Fig. 1; Fig. 3 is a plan of a metal rod that is adapted to be combined with the non-metallic tube of Fig. 1; Fig. 4 is an elevation of the same, illustrating a step in the preferred method of mounting it in the non-metallic tube; Fig. 5 illustrates another step in the preferred method of manufacture; Figs. 6 and 7 are, respectively, a plan and an elevation of the completed article, prior to the final step of bending it into the shape of a temple; Fig. 8 is an elevation of the completed temple; and Figs. 9 and 10 are sections taken upon the lines 9—9 and 10—10 of Fig. 7.

The preferred temple of the present invention is preferably made by first squirting or otherwise injecting acetone or some other softening element into the bore 30 of a tube 32 that is constituted of some non-metallic material, like zylonite. This will have the effect of softening the inner wall or bore of the tube. The softened material expands beyond its original dimensions, thereby decreasing the diameter of the bore from the full-line circle 36 to the dotted-line circle 38, indicated in Fig. 2. A metal rod 40 of somewhat greater diameter than the diameter of the circle 38 is then inserted into the bore and forced endwise thereinto, driving the softened material in advance of it, as will be understood from the showing at 42 of Fig. 4. The mass of the softened material accumulates until, when the rod 40 has been forced into the tube a predetermined distance, the softened material 42 will have entirely closed the bore, which condition is illustrated at 44, Fig. 5. The softened zylonite plugged at 44 between the end of the tube and the rod will harden into a solid mass. The inner or forward end 46 of the tube may be compressed against the metal into the form shown. The resulting structure may then be bent into the customary shape, illustrated at 48, completing the temple. The forward end of the rod is shown integrally provided with an end piece or hinge member, whereby the temple may be hinged to a spectacle frame.

To render the temple flexible, the rod 40 is made flexible prior to its assembly with the tube 32. As the flexibility is most needed at the forward portion of the temple, it is the forward portion 50 of the rod 40 that is endowed with flexibility. The preferred method of rendering the forward portion 50 of the rod 40 flexible is to flatten it, as will be understood from a comparison of Figs. 3 and 4. The rod is thus rendered flexible in a direction transverse to the plane of the flattened portion 50. The effect of this flexibility would be lost in part after the rod has been mounted in the tube 32, as shown in Fig. 5. To impart greater flexibility to the completed temple, therefore, the forward portion 52 is then correspondingly flattened, as shown at 54 in Figs. 6, 7 and 10. This flattening may be effected in any desired way, as by means of dies.

The temple of the present invention is readily flexible about its forward portion 54 in a direction towards and from the side of the face of the wearer, and is a marked improvement over the stiff, unflexible temples in use at the present day.

Modifications may be made by persons skilled in the art, and such modifications are intended to be embraced within the spirit and scope of the present invention, as defined in the appended claims.

What is claimed is:

1. A spectacle temple comprising a seamless zylonite tube the bore of which is lined with a solvent that is adapted to soften the zylonite at the wall of the bore, and a reinforcing rod of diameter greater than the diameter of the bore of the softened tube mounted within the bore, a portion of the softened zylonite being collected in the rear end of the bore to close the rear end of the tube and conceal the corresponding end of the rod, and the collected zylonite being hardened, the rear portion of the tube with the reinforcing rod mounted therein being bent to the shape of a temple, the temple being adapted to be hinged at the forward end, the forward portion of the rod being flattened to render it flexible, and the forward portion of the tube being correspondingly flattened.

2. The method of making a spectacle temple adapted to be hinged at the forward end that comprises softening the wall of the bore of a zylonite tube with a solvent, forcing a reinforcing rod of diameter greater than the diameter of the bore of the softened tube, and the forward portion of which is flattened to render it flexible, into the bore so as to cause a portion of the softened zylonite to collect in the tube in advance of the rod and close the bore at the rear end to conceal the corresponding end of the rod, permitting the collected softened zylonite to harden, and bending the rear portion of the tube with the reinforcing rod enclosed therein to the shape of a temple.

In testimony whereof, we have respectively hereunto subscribed our names this 2d day of January, 1923, and this 29th day of January, 1923.

JAMES W. WELSH.
AUSTIN B. BELGARD.